United States Patent Office 2,925,422
Patented Feb. 16, 1960

2,925,422

CERTAIN 3,4-DICYANO, 6-OXY PYRIDONES-2, CORRESPONDING IMINOPYRANS AND PROCESSES OF PREPARATION

Clifford L. Dickinson, Wilmington, Del., assignor to E. I. du Pont de Nemours and Company, Wilmington, Del., a corporation of Delaware No Drawing. Application April 18, 1957
Serial No. 653,532

10 Claims. (Cl. 260—294.9)

The present invention is concerned with a new class of heterocyclic chemical compounds and a process for their preparation. These compounds are useful for preparing fluorescent optical brighteners for detergents.

An important factor in the improvement of soaps and detergents for laundering purposes is the incorporation of chemical whitening agents, brighteners, or optical bleaches for the purpose of making laundered fabrics whiter. These optical bleaches are fluorescent compounds which absorb ultraviolet light and emit visible light when they are applied to textile fibers.

The instant invention is directed to new heterocyclic compounds and to a process for making the same. The novel 6-alkoxy-3,4-dicyano-5,6-disubstituted-2-oxo-$\Delta^3$-tetrahydropyridines and 6-alkoxy-3,4-dicyano-6-substituted-2-imino-$\Delta^3$-dihydropyrans are prepared by reacting an $\alpha$-hydrogen-$\alpha$-1,1,2,2-tetracyanoethyl ketone with an alcohol. Where a cycloalkanol or aralkanol is used as the reacting alcohol, the corresponding 6-cycloalkoxy and 6-aralkoxy derivatives are formed.

It is an object of this invention to prepare novel tetrahydropyridines and dihydropyrans. It is a further object to prepare intermediates for compounds useful as fluorescent optical brighteners. These and other objects will become apparent from the disclosure which follows.

In the $\alpha$-hydrogen-$\alpha$-1,1,2,3-tetracyanoethyl ketones operable in the process of this invention, the $\alpha$-carbon atom of said ketone may (a) carry no further substituent (i.e., be attached to a second hydrogen atom) or (b) carry a hydrocarbyl or substituted hydrocarbyl substituent. The $\alpha'$-carbon atom may be unsubstituted (i.e., methyl), or may be a member of a larger hydrocarbyl or substituted hydrocarbyl group, including the $\alpha$-hydrogen-$\alpha$-1,1,2,2-tetracyanoethyl cyclohexanones in which the $\alpha$- and $\alpha'$-carbon atoms of the ketone are members of the cyclohexanone ring.

The particular heterocyclic products obtained by the process of this invention may be ascertained from the additional substituents, if any, on the $\alpha$-carbon atom of the $\alpha$-hydrogen-$\alpha$-1,1,2,2-tetracyanoethyl ketone starting material.

When the $\alpha$-carbon atom carries a hydrocarbyl or substituted hydrocarbyl substituent, the product obtained is a 6-alkoxy-3,4-dicyano-5,6-disubstituted-2-oxo-$\Delta^3$-tetrahydropyridine. When the $\alpha$-carbon atom carries a second hydrogen atom (i.e., is not further substituted), the product is a 6-alkoxy-3,4-dicyano-6-substituted-2-imino-$\Delta^3$-dihydropyran.

The process of this invention may be illustrated as follows:

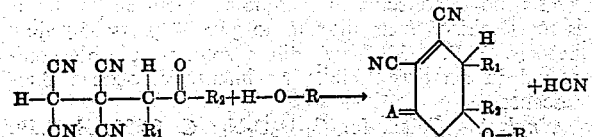

in which $R_2$ is hydrocarbyl (i.e., alkyl, aralkyl, or aryl), or substituted hydrocarbyl (i.e., alkoxyhydrocarbyl or monohalohydrocarbyl) and $R_1$ may be hydrogen, hydrocarbyl (i.e., alkyl, aralkyl, or aryl), or substituted hydrocarbyl (i.e., alkoxyhydrocarbyl or monohalohydrocarbyl), with the proviso that $R_1$ and $R_2$ together may represent the divalent tetramethylene radical. When $R_1$ is hydrogen, A is imino and B is —O—. When $R_1$ is hydrocarbyl or substituted hydrocarbyl, A is oxo and B is —NH—. R is alkyl, aralkyl or cycloalkyl.

The oxo and imino forms included in the structure of the above product may be separately illustrated by the following formulas:

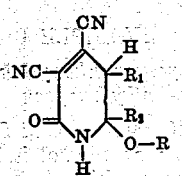

in which R is alkyl, aralkyl, or cycloalkyl; $R_1$ and $R_2$ are both hydrocarbyl or substituted hydrocarbyl with the proviso that $R_1$ and $R_2$ together may represent the divalent tetramethylene radical, and

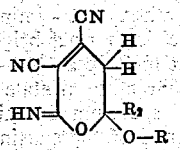

in which $R_2$ is hydrocarbyl or substituted hydrocarbyl and R is as defined above. Preferably R, $R_1$ and $R_2$ in the above formulas contain up to 20 carbon atoms each, and still more preferably are hydrocarbon.

When the products of this invention are heated, particularly at 100° C. and above, alcohol splits out and, in the case of the dihydropyrans, a rearrangement also takes place whereby there is produced the corresponding 3,4-dicyano-6-substituted-2-pyridone. This may be illustrated as follows:

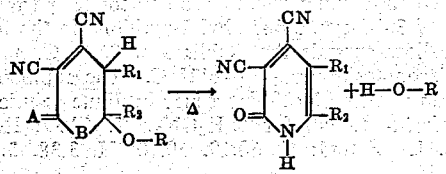

in which A and B are as above, R is alkyl, aralkyl, or cycloalkyl, $R_1$ is hydrogen, hydrocarbyl or substituted hydrocarbyl and $R_2$ is hydrocarbyl or substituted hydrocarbyl. These 3,4-dicyano-6-substituted-2-pyridones are all fluorescent compounds which may be employed as optical brighteners in laundry detergents in the manner known in the art. The fluorescence of these compounds is specifically illustrated in the examples below.

The ease with which the products of this invention are converted to 3,4-dicyano-6-substituted-2-pyridones on heating depends to some extent on the nature of the 6-substituent ($R_2$). When $R_2$ is alkyl, aralkyl or substituted alkyl or aralkyl, the products of this invention are more stable, and moderate heating, i.e., at 100° C. or above, is necessary to split out alcohol and form a fluorescent 2-pyridone. When $R_2$ is aryl or substituted aryl, the products of this invention are less stable, and it is convenient to carry out the formation of the primary product and its conversion to a 2-pyridone in a single step as shown in the examples below.

No catalyst or added ingredients are needed for carrying out the process of this invention. The $\alpha$-hydrogen-$\alpha$-1,1,2,2-tetracyanoethyl ketone and the alcohol may be employed in a wide variety of molar ratios, i.e., from 1:20 to 20:1. For convenience, it is preferred to operate in the presence of a molar excess of the alcohol involved in the reaction so that the unused portion of the alcohol serves as a reaction medium. Examples I and II below illustrate preferred embodiments of this invention.

The reaction should be carried out at temperatures in the range of 70-200° C. but preferably at the reflux temperature of the alcohol involved in order to bring the reaction to completion in a moderate length of time. The reactants should be allowed to react for at least 30 minutes.

The α-hydrogen-α-1,1,2,2-tetracyanoethyl ketones are prepared from tetracyanoethylene and the corresponding ketone as shown in Middleton, U.S. 2,762,837.

In the following examples parts are by weight unless otherwise indicated.

EXAMPLE I

*Part A.—3,4-dicyano-6-ethoxy-2-imino-6-methyl-$\Delta^3$-dihydropyran*

A solution of 940 parts of 4,4,5,5-tetracyano-2-pentanone in 12,000 parts of ethanol is heated under reflux for 40 minutes. The resulting dark solution is then concentrated to about one fifth its original volume at room temperature under reduced pressure. The yellow solid that separates is collected by filtration and washed with ethanol. There is obtained 657 parts (64% yield) of 3,4 - dicyano - 6 - ethoxy - 2 - imino - 6 - methyl - $\Delta^3$-dihydropyran in the form of a bright yellow solid that decomposes without melting at 150-160° C. A sample is recrystallized from ethyl acetate for analysis. The infrared absorption spectrum of this compound shows that the carbonyl band of the starting material has been lost and that an ether linkage has been formed.

*Analysis.*—Calcd. for $C_{10}H_{11}N_3O_2$: C, 58.54; H, 5.37; N, 20.49. Found: C, 58.59, 58.79; H, 5.49, 5.49; N, 20.50, 20.56.

*Part B.—3,4-dicyano-6-methyl-2-pyridone*

A mixture of 24 parts of 3,4-dicyano-6-ethoxy-2-imino-6-methyl-$\Delta^3$-dihydropyran and 500 parts of water is heated at the boiling point until a solution results. This solution is treated with decolorizing carbon and filtered hot. Upon cooling there is obtained 13 parts (70% yield) of 3,4-dicyano-6-methyl-2-pyridone in the form of pale yellow crystals that sublime at 210° C. and melt with decomposition at 241–242° C. The compound exhibits an intense blue fluorescence in dilute solution.

*Analysis.*—Calcd. for $C_8H_5ON_3$: C, 60.37; H, 3.15; N, 26.41. Found: C, 60.19, 60.10; H, 3.38, 3.15; N, 26.04.

EXAMPLE II

*Part A.—3,4-dicyano-6-ethoxy-6-ethyl-5-methyl-2-oxo-$\Delta^3$-tetrahydropyridine*

A solution of 140 parts of 4-methyl-5,5,6,6-tetracyano-3-hexanone in 1200 parts of ethanol is heated under reflux for one hour and poured into 5000 parts of ice water. The gray precipitate of 3,4-dicyano-6-ethoxy-6-ethyl-5-methyl-2-oxo-$\Delta^3$-tetrahydropyridine is collected by filtration. Yield 116 parts (75%). After recrystallization from ethyl acetate, the compound melts at 139.5–140.5° with evolution of ethanol.

*Analysis.*—Calcd. for $C_{12}H_{14}O_2N_3$: C, 61.80; H, 6.44; N, 18.03. Found: C, 61.80, 62.01, 62.26; H, 6.28, 6.63, 6.43; N, 17.75, 17.69.

*Part B.—3,4-dicyano-6-ethyl-5-methyl-2-pyridone*

3,4 - dicyano - 6 - ethoxy - 6 - ethyl - 5 - methyl - 2 - oxo-$\Delta^3$-tetrahydropyridine, 30 parts, is placed in 600 parts of water. The mixture is heated to boiling until a solution results, and this solution is treated with decolorizing carbon and filtered while hot. The pale yellow crystals of 3,4-dicyano-6-ethyl-5-methyl-2-pyridone that separate upon cooling are collected by filtration. Yield 15 parts (62%). This compound melts with decomposition at 226–230° C. An aqueous solution of this compound exhibits a blue fluorescence.

*Analysis.*—Calcd. for $C_{10}H_9ON_3$: C, 64.17; H, 4.81; N, 22.46. Found: C, 64.19; H, 4.58; N, 22.58, 22.60.

EXAMPLE III

*Part A.—3,4-dicyano-8a-ethoxy-2-oxo-$\Delta^3$-octahydroquinoline*

A solution of 113 parts of 2-(α,α,β,β-tetracyanoethyl)cyclohexanone in 790 parts of ethanol is heated under reflux for thirty minutes and poured into 5000 parts of ice-water. 3,4 - dicyano - 8a - ethoxy - 2 - oxo - $\Delta^3$ - octahydroquinoline separates as a solid that is collected by filtration. Yield 100 parts (82%). After recrystallization from ethanol, the compound melts with evolution of ethanol at 161–162° C.

*Analysis.*—Calcd. for $C_{13}H_{15}O_2N_3$: C, 63.68; H, 6.12; N, 17.31. Found: C, 63.87, 63.87; H, 6.00, 6.14; N, 17.18, 17.51.

*Part B.—3,4-dicyano-5,6,7,8-tetrahydro-2(1)-quinolone*

A solution of 350 parts of 3,4-dicyano-8a-ethoxy-2-oxo-$\Delta^3$-octahydroquinoline in 1190 parts of conc. hydrochloric acid is allowed to stand at room temperature, and after five minutes crystals begin to separate. These are collected and recrystallized from ethanol to yield 72 parts (26% yield) of 3,4-dicyano-5,6,7,8-tetrahydro-2(1)-quinolone melting with decomposition at 259–261° C. Dilute solutions of this product show blue fluorescence.

*Analysis.*—Calcd. for $C_{11}H_9ON_3$: C, 66.40; H, 4.52; N, 21.11. Found: C, 66.40; H, 4.62; N, 20.91.

EXAMPLE IV (A) 6-ethoxy-3,4-dicyano-2-imino-6-phenyl-$\Delta^3$-dihydropyran (B) 3,4-dicyano-6-phenyl-2-pyridone A solution of 150 parts of β,β,γ,γ-tetracyanobutyrophenone in 1970 parts of ethanol is heated under reflux for 3½ hours. The 6-ethoxy-3,4-dicyano-2-imino-6-phenyl-$\Delta^3$-dihydropyran which forms is not isolated. The solution is concentrated to about ⅕ its original volume by boiling. The heating noted above is sufficient to bring about rearrangement and loss of ethanol from the intermediate compound, and 79 parts (59% yield) of 3,4-dicyano-6-phenyl-2-pyridone separates from the concentrated solution on cooling. This is washed with ethanol and recrystallized from dioxane to give the product in the form of pale yellow crystals which melt above 300° C. Dilute solutions of this compound show blue fluorescence.

*Analysis.*—Calcd. for $C_{13}H_7ON_3$: C, 70.59; H, 3.17; N, 19.00. Found: C, 70.72, 70.67; H, 3.27, 3.20; N, 18.47, 18.30.

EXAMPLE V (A) 6-ethoxy-3,4-dicyano-2-imino-6-(p-methoxyphenyl)-$\Delta^3$-dihydropyran (B) 3,4-dicyano-6-(p-methoxyphenyl)-2-pyridone A solution of 50 parts of β,β,γ,γ-tetracyano-p-methoxybutyrophenone in 395 parts of ethyl alcohol is heated under reflux for three hours. The 6-ethoxy-3,4-dicyano-2-imino-6-(p - methoxyphenyl) - $\Delta^3$ - dihydropyran which forms is converted by this heating to 3,4-dicyano-6-(p-methoxyphenyl)-2-pyridone which separates as a solid. This solid is collected by filtration. Yield 34 parts. It is recrystallized from dioxane to give 12 parts of yellow needles, M.P. >300°. A dilute solution of this compound in acetone exhibits an intense blue-green fluorescence.

*Analysis.*—Calcd. for $C_{14}H_9O_2N_3$: C, 66.93; H, 3.59; N, 16.73. Found: C, 66.87, 67.01; H, 3.78, 3.89; N, 16.76, 16.96.

EXAMPLE VI (A) 3,4-dicyano-5,6-diphenyl-6-ethoxy-2-oxo-$\Delta^3$-tetrahydropyridine (B) 3,4-dicyano-5,6-diphenyl-2-pyridone A solution of 200 parts of α-phenyl-β,β,γ,γ-butyrophenone in 2370 parts of ethanol is heated under reflux for five hours, and then concentrated to about ⅓ its original volume. During this heating the 3,4-dicyano-5,6-diphenyl-6-ethoxy-2-oxo-$\Delta^3$-tetrahydropyridine which forms splits out ethanol to give 3,4-dicyano-5,6-diphenyl-2-pyridone which separates as a deep red solid upon standing. This is collected by filtration to give 73 parts of the product which melts at 223–228° C. After several recrystallizations from ethanol there is obtained 13 parts of bright yellow crystals, M.P. 226–268° C.

*Analysis.*—Calcd. for $C_{19}H_{11}ON_3$: C, 76.20; H, 3.70; N, 14.14. Found: C, 76.65, 76.61; H, 3.71, 3.78; N, 13.96, 13.88.

Examples of additional embodiments of this invention are summarized in the table below. This table also shows the ketone reacted with tetracyanoethylene according to Middleton, U.S. 2,762,837, to prepare the α-hydrogen-α-1,1,2,2-tetracyanoethyl ketone starting materials. In addition to the primary product (A) formed on reacting the tetracyanoethyl ketone with an alcohol, there is also shown the fluorescent 2-pyridone (B) to which the primary product is converted by heating. In items 1, 2, 3, 10, and 11 the procedure of Example IV is used. In items 4, 5, 9, 12, 13, 14, and 15 the procedure of Example I is used. In items 6, 7, 17, 19, 20, 21, 22, and 23 the procedure of Example II is used and in items 8, 16, and 18 the procedure of Example VI is used.

| | Ketone Which is Reacted with Tetracyanoethylene | α-Hydrogen-α-1,1,2,2-tetracyanoethyl Ketone | Alcohol Employed | A. Product Formed | B. Fluorescent 2-Pyridone Obtained on Heating Product A |
|---|---|---|---|---|---|
| 1 | p-chloroacetophenone. | p-chloro-α-(1,1,2,2-tetracyanoethyl)-acetophenone. | isopropyl alcohol | 6-(p-chlorophenyl)-3,4-dicyano-2-imino-6-isopropoxy-$\Delta^3$-dihydropyran. | 6-(p-chlorophenyl)-3,4-dicyano-2-pyridone. |
| 2 | 1-acetonaphthone. | α-(1,1,2,2-tetracyanoethyl)-1-acetonaphthone. | methanol | 3,4-dicyano-2-imino-6-methoxy-6-(1-naphthyl)-$\Delta^3$-dihydropyran. | 3,4-dicyano-6-(1-naphthyl)-2-pyridone. |
| 3 | 2-acetonaphthone. | α-(1,1,2,2-tetracyanoethyl)-2-acetonaphthone. | do | 3,4-dicyano-2-imino-6-methoxy-6-(2-naphthyl)-$\Delta^3$-dihydropyran. | 3,4-dicyano-6-(2-naphthyl)-2-pyridone. |
| 4 | 3-methyl-3-phenyl-2-butanone. | 5,5,6,6-tetracyano-2-methyl-2-phenyl-3-hexanone. | ethanol | 6-ethoxy-3,4-dicyano-2-imino-6-(2-phenylisopropyl)-$\Delta^3$-dihydropyran. | 3,4-dicyano-6-(2-phenylisopropyl)-2-pyridone. |
| 5 | 3-tert-butyl-3,5,5-trimethyl-2-hexanone. | 5-tert-butyl-1,1,2,2-tetracyano-5,7,7-trimethyl-4-octanone. | octadecyl alcohol | 6-(1-tert-butyl-1,3,3-trimethylbutyl)-3,4-dicyano-2-imino-6-octadecyloxy-$\Delta^3$-dihydropyran. | 6-(1-tert-butyl-1,3,3-trimethylbutyl)-3,4-dicyano-2-pyridone. |
| 6 | stearone (18-pentatriacontanone). | 17-(1,1,2,2-tetracyanoethyl)-18-pentatriacontanone. | do | 3,4-dicyano-6-heptadecyl-5-hexadecyl-6-octadecyloxy-2-oxo-$\Delta^3$-tetrahydropyridine. | 3,4-dicyano-6-heptadecyl-5-hexadecyl-2-pyridone. |
| 7 | di(β-phenethyl) ketone. | 4-benzyl-5,5,6,6-tetracyano-1-phenyl-3-hexanone. | cyclohexanol | 5-benzyl-6-cyclohexyloxy-3,4-dicyano-2-oxo-6-(β-phenethyl)-$\Delta^3$-tetrahydropyridine. | 5-benzyl-3,4-dicyano-6-(β-phenethyl)-2-pyridone. |
| 8 | benzyl 1-naphthyl ketone. | α-(1,1,2,2-tetracyanoethyl)-α-phenyl-1-acetonaphthone. | methanol | 3,4-dicyano-2-oxo-6-methoxy-6-(1-naphthyl)-5-phenyl-$\Delta^3$-tetrahydropyridine. | 3,4-dicyano-6-(1-naphthyl)-5-phenyl-2-pyridone. |
| 9 | bis(2-p-methoxyphenethyl) ketone. | 2-(p-methoxyphenyl)-ethyl-2-(p-methoxyphenyl)-1-(1,1,2,2-tetracyanoethyl)ethyl ketone. | do | 3,4-dicyano-6-methoxy-5-(p-methoxybenzyl)-6-(p-methoxyphenethyl)-2-oxo-$\Delta^3$-tetrahydropyridine. | 3,4-dicyano-5-(p-methoxybenzyl)-6-(p-methoxyphenyl)-2-pyridone. |
| 10 | p-chlorophenyl-β-phenethyl ketone. | p-chlorophenyl-2-phenyl-1-(1,1,2,2-tetracyanoethyl) ethyl ketone. | ethanol | 5-benzyl-6-(p-chlorophenyl)-3,4-dicyano-6-ethoxy-2-oxo-$\Delta^3$-tetrahydropyridine. | 5-benzyl-6-(p-chlorophenyl)-3,4-dicyano-2-pyridone. |
| 11 | o-chlorophenethyl phenyl ketone. | 2-(o-chlorophenyl)-1-(1,1,2,2-tetracyanoethyl) ethyl phenyl ketone. | methanol | 5-(o-chlorobenzyl)-3,4-dicyano-6-methoxy-6-phenyl-2-oxo-$\Delta^3$-tetrahydropyridine. | 5-(o-chlorobenzyl)-3,4-dicyano-6-phenyl-2-pyridone. |
| 12 | Bromoacetone. | 1-bromo-4,4,5,5-tetracyano-2-pentanone. | benzylalcohol | 6-benzyloxy-6-bromomethyl-3,4-dicyano-2-imino-$\Delta^3$-dihydropyran. | 6-bromomethyl-3,4-dicyano-2-pyridone. |
| 13 | 3,3-di(p-chlorophenyl)-2-butanone. | 2,2-di(p-chlorophenyl)-5,5,6,6-tetracyano-3-hexanone. | n-butyl alcohol | 6-butoxy-6-(1,1-di[p-chlorophenyl]ethyl)-3,4-dicyano-2-imino-$\Delta^3$-dihydropyran. | 6-(1,1-di[p-chlorophenyl]ethyl)-3,4-dicyano-2-pyridone. |
| 14 | 3,3-di(methoxymethyl)-2-butanone. | 2,2-di(methoxymethyl)-5,5,6,6-tetracyano-3-hexanone. | ethanol | 3,4-dicyano-6-ethoxy-2-imino-6-(1,1-di[methoxymethyl]ethyl)-$\Delta^3$-dihydropyran. | 3,4-dicyano-6-(1,1-di[methoxymethyl]ethyl)-2-pyridone. |
| 15 | 3,3-di(p-methoxyphenyl)-2-butanone. | 2,2-di(p-methoxyphenyl)-5,5,6,6-tetracyano-3-hexanone. | do | 3,4-dicyano-6-ethoxy-2-imino-6-(1-1,di[p-methoxyphenyl]ethyl)-$\Delta^3$-dihydropyran. | 3,4-dicyano-6-(1,1-di[p-methoxyphenyl]ethyl)-2-pyridone. |
| 16 | 3-chloropropyl phenyl ketone. | 1-(2-chloroethyl)-2,2,3,3-tetracyanopropyl phenyl ketone. | methanol | 5-(2-chloroethyl)-3,4-dicyano-6-methoxy-2-oxo-6-phenyl-$\Delta^3$-tetrahydropyridine. | 5-(2-chloroethyl)-3,4-dicyano-6-phenyl-2-pyridone. |
| 17 | p-chlorobenzyl methyl ketone. | 3-(p-chlorophenyl)-4,4,5,5-tetracyano-2-pentanone. | propyl alcohol | 5-(p-chlorophenyl)-3,4-dicyano-6-methyl-2-oxo-6-propoxy-$\Delta^3$-tetrahydropyridine. | 5-(p-chlorophenyl)-3,4-dicyano-6-methyl-2-pyridone. |
| 18 | 2-methoxyethyl phenyl ketone. | 1-methoxymethyl-2,2,3,3-tetracyanopropyl phenyl ketone. | methanol | 3,4-dicyano-6-methoxy-5-methoxymethyl-2-oxo-6-phenyl-$\Delta^3$-tetrahydropyridine. | 3,4-dicyano-5-methoxymethyl-6-phenyl-2-pyridone. |
| 19 | p-methoxybenzyl methyl ketone. | 3-(p-methoxyphenyl)-4,4,5,5-tetracyano-2-pentanone. | do | 3,4-dicyano-6-methoxy-5-(p-methoxyphenyl)-6-methyl-2-oxo-$\Delta^3$-tetrahydropyridine. | 3,4-dicyano-5-(p-methoxyphenyl)-6-methyl-2-pyridone. |
| 20 | bromomethyl ethyl ketone. | 1-bromo-3-methyl-4,4,5,5-tetracyano-2-pentanone. | do | 6-bromomethyl-3,4-dicyano-6-methoxy-5-methyl-2-oxo-$\Delta^3$-tetrahydropyridine. | 6-bromomethyl-3,4-dicyano-5-methyl-2-pyridone. |
| 21 | 4,4-di(p-chlorophenyl)-3-hexanone. | 3,3-di(p-chlorophenyl)-5-methyl-6,6,7,7-tetracyano-4-heptanone. | ethanol | 6-(1,1-di[p-chlorophenyl]propyl)-3,4-dicyano-6-ethoxy-5-methyl-2-oxo-$\Delta^3$-tetrahydropyridine. | 6-(1,1-di[p-chlorophenyl]propyl)-3,4-dicyano-5-methyl-2-pyridone. |
| 22 | 4,4-di(2-methoxyethyl)-3-hexanone. | 3,3-di(2-methoxyethyl)-5-methyl-6,6,7,7-tetracyano-4-heptanone. | 2-phenyl ethanol | 3,4-dicyano-6-(1,1-di[2-methoxyethyl]propyl)-5-methyl-2-oxo-6-(2-phenylethoxy)-$\Delta^3$-tetrahydropyridine. | 3,4-dicyano-6-(1,1-di[2-methoxyethyl]propyl)-5-methyl-2-pyridone. |
| 23 | 4,4-di(p-methoxyphenyl)-3-hexanone. | 3,3-di(p-methoxyphenyl)-5-methyl-6,6,7,7-tetracyano-4-heptanone. | methanol | 3,4-dicyano-6-methoxy-6-(1,1-di[p-methoxyphenyl]-propyl)-5-methyl-2-oxo-$\Delta^3$-tetrahydropyridine. | 2,4-dicyano-6-(1,1-di[p-methoxyphenyl]propyl)-5-methyl-2-pyridone. |

I claim:
1. Compounds selected from the class consisting of those represented by the formula

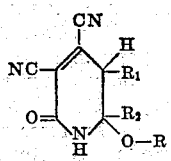

in which R is a hydrocarbyl radical free of aliphatic carbon-to-carbon unsaturation having up to 20 carbon atoms and is selected from the group consisting of alkyl, aralkyl and cycloalkyl; $R_2$ is a radical free of aliphatic carbon-to-carbon unsaturation having up to 20 carbon atoms selected from the group consisting of alkyl, aralkyl hydrocarbon, aryl hydrocarbon, alkoxyhydrocarbyl and monohalohydrocarbyl radicals, $R_1$ is selected from the group consisting of hydrogen and $R_2$, with the proviso that $R_1$ and $R_2$ together can represent the divalent tetramethylene radical; and by the formula

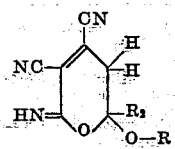

in which R and $R_2$ have the same significance as above.

2. 3,4 - dicyano - 6 - ethoxy - 2 - imino - 6 - methyl-$\Delta^3$-dihydropyran.
3. 3,4 - dicyano - 6 - ethoxy - 6 - ethyl - 5 - methyl - 2-oxo-$\Delta^3$-tetrahydropyridine.
4. 3,4 - dicyano - 8a - ethoxy - 2 - oxo - $\Delta^3$ - octahydroquinoline.
5. 6 - ethoxy - 3,4 - dicyano - 2 - imino - 6 - phenyl-$\Delta^3$-dihydropyran.
6. 6 - ethoxy - 3,4 - dicyano - 2 - imino - 6 - (p - methoxyphenyl)-$\Delta^3$-dihydropyran.
7. 3,4 dicyano - 5,6 - diphenyl - 6 - ethoxy - 2 - oxo-$\Delta^3$-tetrahydropyridine.
8. A process comprising heating at a temperature of from 70 to 200° C. for a period of at least 30 minutes a compound selected from the class consisting of (1) those represented by the formula

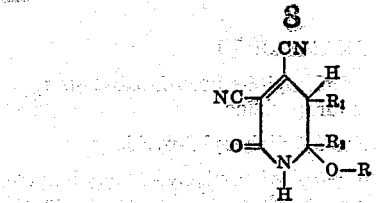

in which R is a hydrocarbyl radical free of aliphatic carbon-to-carbon unsaturation of up to 20 carbon atoms and is selected from the group consisting of alkyl, aralkyl and cycloalkyl, $R_2$ is a radical free of aliphatic carbon-to-carbon unsaturation of up to 20 carbon atoms selected from the group consisting of alkyl, aralkyl hydrocarbon, aryl hydrocarbon, alkoxyhydrocarbyl and monohalohydrocarbyl, $R_1$ is selected from the group consisting of hydrogen and $R_2$, with the proviso that $R_1$ and $R_2$ together can represent the divalent tetramethylene radical; and (2) those represented by the formula

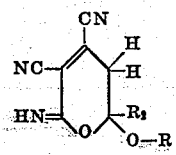

in which R and $R_2$ have the same significance as above, to produce 2-pyridones.

9. The process comprising reacting at a temperature in the range of 70–200° C. and for a period of at least 30 minutes a compound of the formula

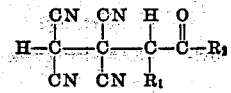

wherein $R_2$ is a radical free of aliphatic carbon-to-carbon unsaturation having up to 20 carbon atoms and is selected from the group consisting of alkyl, aralkyl hydrocarbon, aryl hydrocarbon, alkoxyhydrocarbyl, and monohalohydrocarbyl; $R_1$ is selected from the group consisting of hydrogen and $R_2$, with the proviso that $R_1$ and $R_2$ can be joined together to form the divalent tetramethylene radical, and a compound of the formula ROH wherein R is a hydrocarbyl radical free of aliphatic carbon-to-carbon unsaturation having up to 20 carbon atoms and is selected from the group consisting of alkyl, aralkyl and cycloalkyl.

10. The process of claim 9 wherein the resulting product is heated to a temperature of at least 100° C. to produce 2-pyridones.

No references cited.